(12) United States Patent
Kim et al.

(10) Patent No.: US 8,115,859 B2
(45) Date of Patent: Feb. 14, 2012

(54) METHOD FOR CONTROLLING AUTO-EXPOSURE

(75) Inventors: Gyu Won Kim, Gyunggi-Do (KR); Hak Sun Kim, Daejeon (KR); Won Tae Choi, Gyunggi-Do (KR); Kyoung Joong Min, Seoul (KR); Joo Young Ha, Gyunggi-Do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 350 days.

(21) Appl. No.: 12/437,784

(22) Filed: May 8, 2009

(65) Prior Publication Data

US 2010/0134650 A1 Jun. 3, 2010

(30) Foreign Application Priority Data

Dec. 1, 2008 (KR) .................. 10-2008-0120545

(51) Int. Cl.
*H04N 5/20* (2006.01)
*H04N 5/238* (2006.01)
*G03B 7/00* (2006.01)

(52) U.S. Cl. .................. 348/364; 348/255; 396/236
(58) Field of Classification Search .............. 348/255, 348/362–364; 396/213, 236
See application file for complete search history.

(56) References Cited

U.S. PATENT DOCUMENTS

| | | | | |
|---|---|---|---|---|
| 5,745,808 A * | 4/1998 | Tintera | ................. | 396/236 |
| 5,831,676 A * | 11/1998 | Takahashi et al. | ............ | 348/362 |
| 2002/0071049 A1* | 6/2002 | Bell et al. | ............... | 348/364 |
| 2003/0223010 A1* | 12/2003 | Kaplinsky et al. | ............ | 348/362 |
| 2004/0263673 A1* | 12/2004 | Kikuchi et al. | ............... | 348/345 |
| 2005/0264682 A1* | 12/2005 | Kurane | ................... | 348/362 |
| 2006/0262215 A1* | 11/2006 | Wang | ..................... | 348/362 |

FOREIGN PATENT DOCUMENTS

JP 2006-025012 A 1/2006

* cited by examiner

*Primary Examiner* — Timothy J Henn
(74) *Attorney, Agent, or Firm* — Lowe, Hauptman, Ham & Berner, LLP

(57) ABSTRACT

An auto-exposure control method includes: creating an exposure table and an analog gain table including an exposure time and an analog gain of an image sensor set according to an index, respectively; calculating an average luminance value of an image frame obtained by the image sensor; checking whether or not the average luminance value is within a pre-set range including a prescribed final target value; if the average luminance value is not within the pre-set range, determining a shift step from indexes which have been applied to a current image frame according to the difference between the average luminance value and the final target value in order to determine indexes of the exposure table and the analog gain table to be applied to a next image frame; and repeatedly performing of reading an exposure time and an analog gain corresponding to the indexes shifted by the shift step determined from the indexes applied to the current image frame, from the exposure table and the analog gain table, applying the same to the image sensor, obtaining a next image frame, and calculating an average luminance value.

7 Claims, 5 Drawing Sheets

METHOD FOR CONTROLLING AUTO-EXPOSURE

CROSS-REFERENCE TO RELATED APPLICATIONS

This application claims the priority of Korean Patent Application No. 2008-0120545 filed on Dec. 1, 2008, in the Korean Intellectual Property Office, the disclosure of which is incorporated herein by reference.

BACKGROUND OF THE INVENTION

1. Field of the Invention

The present invention relates to an auto-exposure control method and, more particularly, to a fast and stable auto-exposure control method of a digital image capturing device using an image sensor such as a digital camera, a compact camera module, and the like.

2. Description of the Related Art

Recently, a compact camera module employing an image sensor such as a CCD or a CMOS is installed in a mobile communication terminal to provide a camera function and also actively applied for vehicles to monitor front and rear blind spots.

Thus, algorithms for applying various camera functions such as auto-focusing (AF), auto-white balance (AWB), auto-exposure (AE), and the like, to small cameras are required. In particular, the conventional, known algorithms developed for auto-exposure are largely applied to a dedicated digital still camera system, which may be performed by a processor with a sufficient performance for processing the auto-exposure algorithms. Thus, it is not possible to apply the conventional auto-exposure algorithms to a camera module installed in the mobile communication terminals or in vehicles that do not have a dedicated processor of high performance for image processing due to a cost or size-related problem, and if ever, much time would be taken to determine a proper exposure value because of a huge amount of calculation and the like. Thus, an algorithm for controlling auto-exposure quickly and stably with a smaller amount of calculation is required for a compact camera module applied to the mobile communication terminals or vehicles.

SUMMARY OF THE INVENTION

An aspect of the present invention provides a fast and stable auto-exposure control method of a digital image capturing device such as a digital camera, a compact camera module, and the like.

According to an aspect of the present invention, there is provided an auto-exposure control method including: creating an exposure table and an analog gain table including an exposure time and an analog gain of an image sensor set according to an index, respectively; calculating an average luminance value of an image frame obtained by the image sensor; checking whether or not the average luminance value is within a pre-set range including a prescribed final target value; if the average luminance value is not within the pre-set range, determining a shift step from indexes which have been applied to a current image frame according to the difference between the average luminance value and the final target value in order to determine indexes of the exposure table and the analog gain table to be applied to a next image frame; and repeatedly performing of reading an exposure time and an analog gain corresponding to the indexes shifted by the shift step determined from the indexes applied to the current image frame, from the exposure table and the analog gain table, applying the same to the image sensor, obtaining a next image frame, and calculating an average luminance value.

The method may further include: if the average luminance value is within the pre-set range, determining whether or not the average luminance value is substantially the same as the final target value; if the average luminance value is not the same as the final target value, determining the indexes of the exposure table and the analog gain table to be applied to the next image frame as neighbor indexes of the indexes which have been applied to the current image frame; proceeding to read an exposure time and analog gain corresponding to the determined neighbor indexes from the exposure table and the analog gain table, apply the same to the image sensor, obtain a next image frame, calculate an average luminance value of the obtained next image frame, and determine whether or not the average luminance value is substantially same as the final target value; and if the average luminance value is substantially the same as the final target value, terminating the auto-exposure controlling operation.

The creating of the exposure table and the analog gain table may include: calculating a maximum exposure time in consideration of a flicker and the characteristics of the image sensor; applying a reference index of the exposure table to the calculated maximum exposure time; multiplying a pre-set time factor to an exposure time of a previous index, starting from the maximum exposure time as the reference index, to determine an exposure time of a next index to thus complete the exposure table; and creating an analog gain table of each index of the completed exposure table.

In this case, in calculating the maximum exposure time, the maximum exposure time may be calculated by Equation 1 shown below:

$$\text{Max\_exp} = \frac{\text{Round}(\text{Duration} \times n \times \text{AntiFlickerFreq})}{n \times \text{AntiFlickerFreq}} \quad [\text{Equation 1}]$$

wherein Max_exp is a maximum exposure time, Duration is a maximum exposure time for obtaining a user desired frame rate, 'n' is a positive integer, AntiFlickerFreq is a frequency at which flicker is generated, and Round is an operator for making a positive number through rounding off.

The maximum analog gain allocated to the index of the analog gain table applied to each of the exposure table indexes may be determined as an analog gain that does not generate noise during the corresponding exposure time The maximum analog gain at the analog gain index applied to the exposure table index to which the maximum exposure time has been allocated among the exposure table indexes may be an analog gain that can be applied as a maximum value in a low illumination mode.

The calculating of the average luminance value may include: cropping the image frame obtained by the image sensor; dividing the cropped image frame into a plurality of regions; calculating a luminance value of each divided region; applying a weight value to the calculated luminance value of each divided region; and calculating an average luminance value by using at least a portion of the weight value-applied luminance values.

In determining the shift step, if the average luminance value is positioned to be close to a boundary value of the pre-set range, the shift index step may be set to be smaller, and if the average luminance value is positioned to be away from the boundary value of the pre-set range, the shift index step may be set to larger.

In the auto-exposure control method according to the present invention, an index shift step for changing an index according to a range within which an average luminance value of an image frame comes is set to be different based on the distance between the average luminance value and a final target value. That is, if the difference between the average luminance value of the image frame and the final target value is large, the average luminance value of the image frame is adjusted to be quickly close to the final target value, and if the difference between the average luminance value of the image frame and the final target value is small, the index shift step is set to be minimized to stably find out the final target value.

In addition, the table for determining for an exposure time and an analog gain of the image sensor is created in consideration of a flicker, to thereby prevent generation of a flickering phenomenon in the auto-exposure controlling process.

Also, in the process of calculating the average luminance of an image frame obtained by the image sensor, the amount of calculation of hardware is reduced through image cropping, sectioning, weight value applying, region selecting, and the like, and an important portion of the image can be optimally exposed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
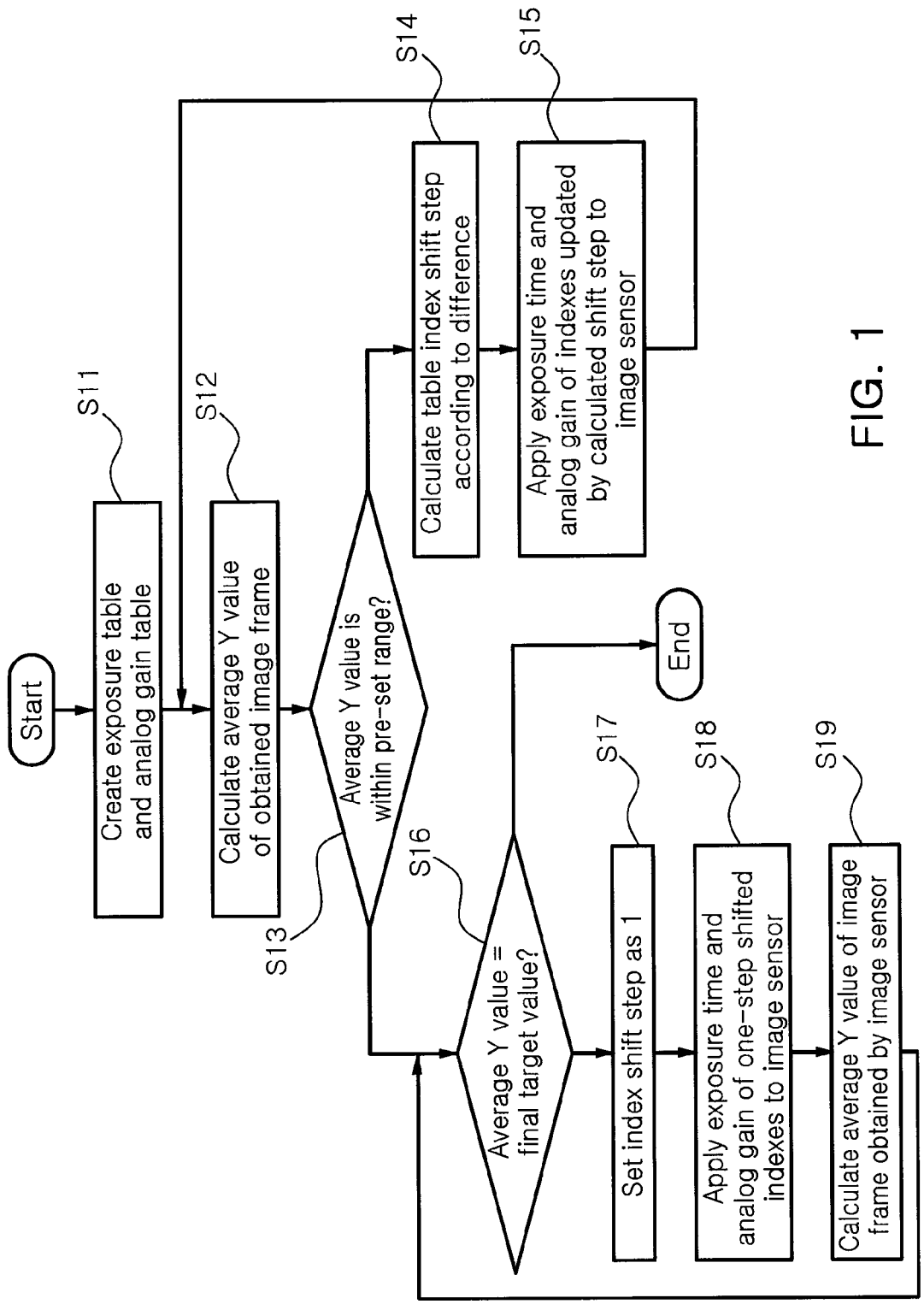
FIG. 1 is a flow chart illustrating an auto-exposure control method according to an embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a flow chart illustrating an auto-exposure control method according to an embodiment of the present invention.

As shown in FIG. 1, the auto-exposure control method according to an embodiment of the present invention includes a step (S11) of creating an exposure table and analog gain table, a step (S12) of calculating an average luminance value (Y value) of an image frame, and a step (S13) of determining whether or not the average luminance value is within a prescribed set range.

If the average luminance value is not within the prescribed set range after performing the step (S13) of determining whether the average luminance value is within the prescribed set range, the auto-exposure control method according to an embodiment of the present invention may further include a step (S14) of calculating a shift step from a current index to determine an index to be applied to a next image frame, and a step (S15) of reading an exposure time and an analog gain corresponding to the index shifted according to the calculated shift step respectively from the exposure table and the analog gain table and applying the same to an image sensor. After an image frame is obtained again from the image sensor to which the exposure time and the analog gain have been applied, the step (S12) of calculating an average luminance value (Y value) of the image frame and the step (S13) of determining whether or not the average luminance value is within the prescribed set range may be repeatedly performed.

If the average luminance value is within the prescribed set range after performing the step (S13) of determining whether the average luminance value is within the prescribed set range, the auto-exposure control method according to an embodiment of the present invention may include a step (S16) of checking whether the average luminance value is substantially the same as a prescribed final target value, a step (S18) of determining an index of the exposure table and the analog gain table to be applied to the next image frame as a neighbor index of the index which has been applied to the current image frame, if the average luminance value is not the same as the final target value, a step (S18) of reading the exposure time and the analog gain corresponding to the determined neighbor index from the exposure table and the analog gain table and applying the same to the image sensor; and a step (S19) of calculating an average luminance value of a next image frame obtained from the image sensor to which the new exposure time and the analog gain have been applied. The average luminance value of the next image frame is compared to the final target value (S16). Meanwhile, if it is determined that the average luminance value is substantially the same as the prescribed final target value in step S16, the exposure controlling is terminated.

The operation and effect of the auto-exposure control method according to an embodiment of the present invention will now be described in detail by stages.

Figure 2:
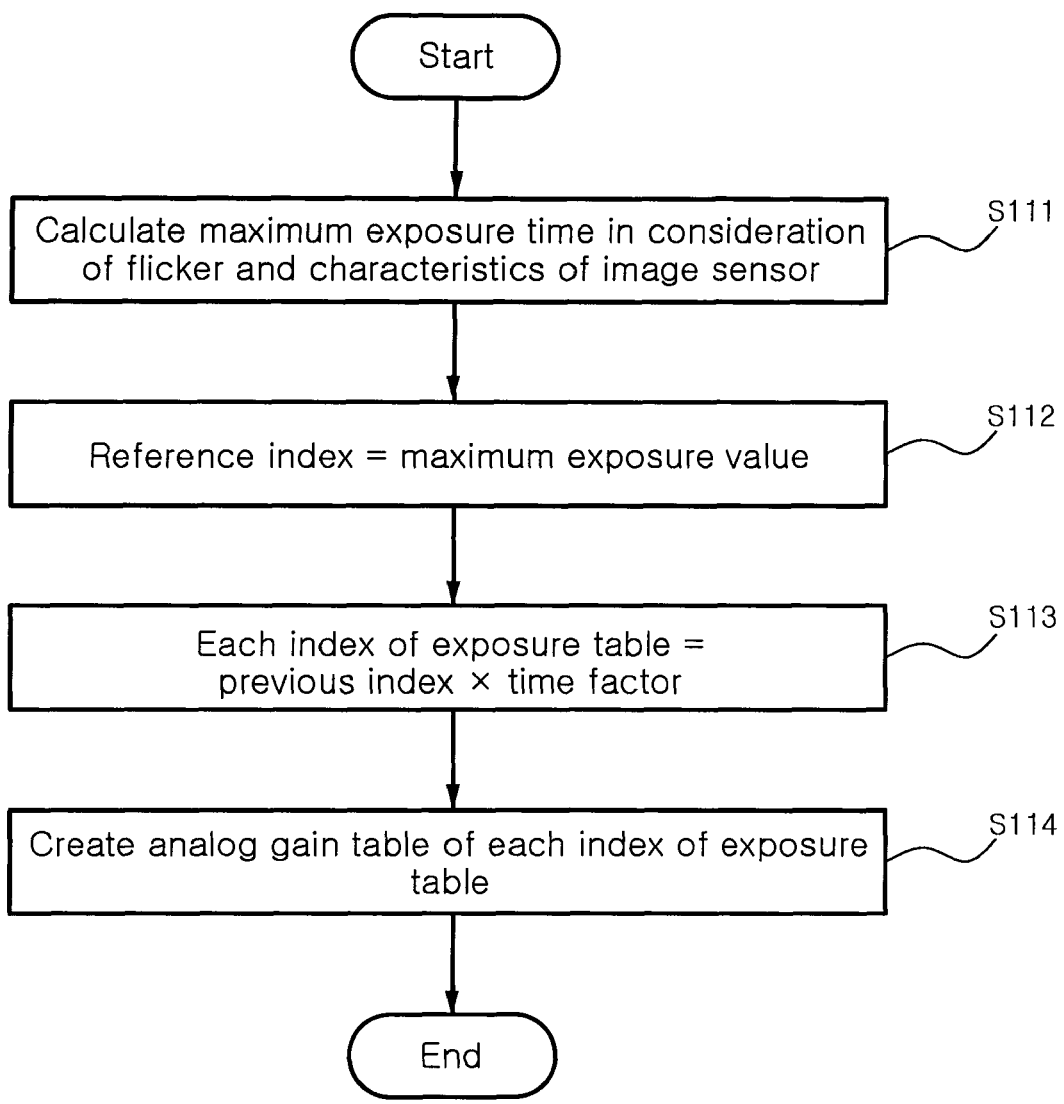
FIG. 2 is a flow chart illustrating the process of creating an exposure table and an analog gain table in the auto-exposure control method according to an embodiment of the present invention.

FIG. 2 is a flow chart illustrating the process of creating the exposure table and the analog gain table in the auto-exposure control method according to an embodiment of the present invention.

As shown in FIG. 2, the step (S11) of creating the exposure table and the analog gain table may include a step (S111) of calculating a maximum exposure time in consideration of a flicker and the characteristics of the image sensor, a step (S112) of applying a reference index of the exposure table to the calculated maximum exposure time, a step of completing the exposure table by multiplying a pre-set time factor to an exposure time of a previous index, starting from the maximum exposure time as the reference index, to thus determine an exposure time of a next index, and a step (S114) of creating an analog gain table of each index of the completed exposure table.

In the step (S111) of calculating the maximum exposure time in consideration of a flicker and the characteristics of the image sensor, the maximum exposure time may be determined by using a frequency causing a flicker, time required for reading one row of the image sensor, and a maximum exposure time for obtaining a frame rate desired by a user. For example, the maximum exposure may be determined by Equation 1 shown below:

$$\text{Max\_exp} = \frac{\text{Round}(\text{Duration} \times n \times \text{AntiFlickerFreq})}{n \times \text{AntiFlickerFreq}} \quad \text{[Equation 1]}$$

In Equation 1, Max_exp is a maximum exposure time, wherein Max_exp is a maximum exposure time, Duration is a maximum exposure time for obtaining a user desired frame rate, 'n' is a positive integer, AntiFlickerFreq is a frequency at which flicker is generated, and Round is an operator for making a positive number through rounding off.

And, in the step (S112) of applying the reference index of the exposure table to the calculated maximum exposure time, an index as a reference among indexes of the exposure table is assigned to the calculated maximum exposure time. An exposure time to be allocated to the other remaining indexes may be determined based on the index of the maximum exposure time.

And then, in the step (S113) of completing the exposure table, a pre-set time factor is multiplied to an exposure time corresponding to a previous index, starting from the reference index assigned to the maximum exposure time, to determine an exposure time corresponding to a next index. Namely, the exposure time of the next index of the reference index to which the maximum exposure time is applied is determined by the result obtained by multiplying the time factor to the maximum exposure time. In step S113, the process of determining an exposure time to be assigned to a next index by multiplying the time factor to the exposure time of the previous index is repeatedly performed until before an obtained value is smaller than a pre-set minimum exposure time when the time factor is multiplied thereto. Through this process, each exposure time assigned to the plurality of indexes of the exposure table is determined, thereby completing creating of the exposure table.

Figure 3:
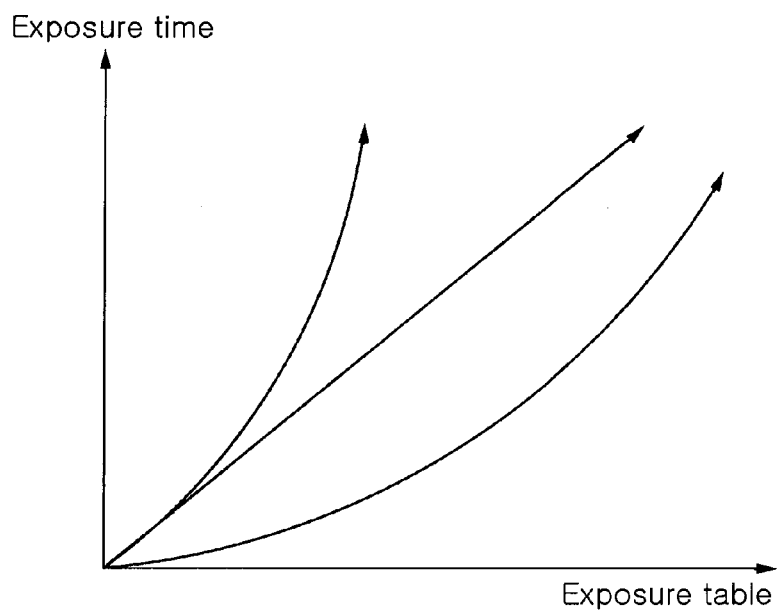
FIG. 3 is a graph illustrating the process for determining an exposure table in crating the exposure table and analog gain table in the auto-exposure control method according to an embodiment of the present invention.

In step S113, the speed of auto-exposure controlling employing the exposure table may be adjusted by properly adjusting the size of the time factor multiplied to the exposure time. As shown in FIG. 3, when the time factor is adjusted, the indexes of the exposure table change, and accordingly, variation of the exposure time determined by indexes can be adjusted. Thus, the exposure table can be created to be suitable for the user need by suitably adjusting the time factor.

Figure 4:
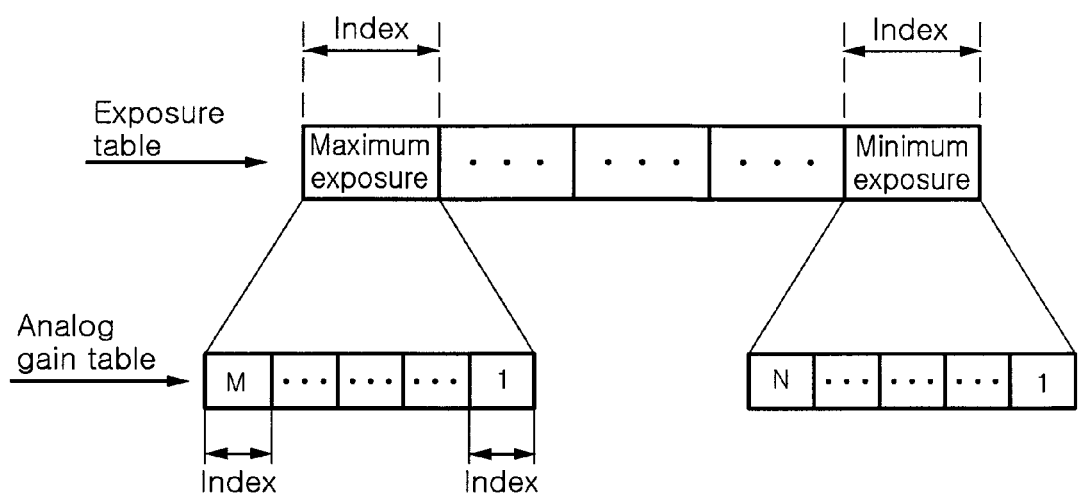
FIG. 4 is a view illustrating an exposure table and an analog gain table determined in the exposure table and analog gain table creating process of the auto-exposure control method according to an embodiment of the present invention.

In the step (S114) of creating an analog table of each index of the completed exposure table, an analog gain index is determined by indexes of the exposure table in order to minutely control exposing of an image during the exposure time corresponding to the indexes of the exposure table. FIG. 4 illustrates the relationship between the exposure table and the analog gain table. As shown in FIG. 4, each exposure time is assigned to each index of the exposure table, and indexes of a plurality of analog gain tables are assigned to each index of the exposure table. In the analog gain tables applied to each index of the exposure table, a maximum analog gain (N) allocated to an index may be determined as an analog gain that does not generate noise during a corresponding exposure time, and a minimum analog gain may be determined as a unit gain. In particular, in an analog gain index with respect to an index of the exposure table to which the maximum exposure time is allocated, the maximum analog gain may be determined as an analog gain that can be applied to the maximum in a low illumination mode.

Figure 5:
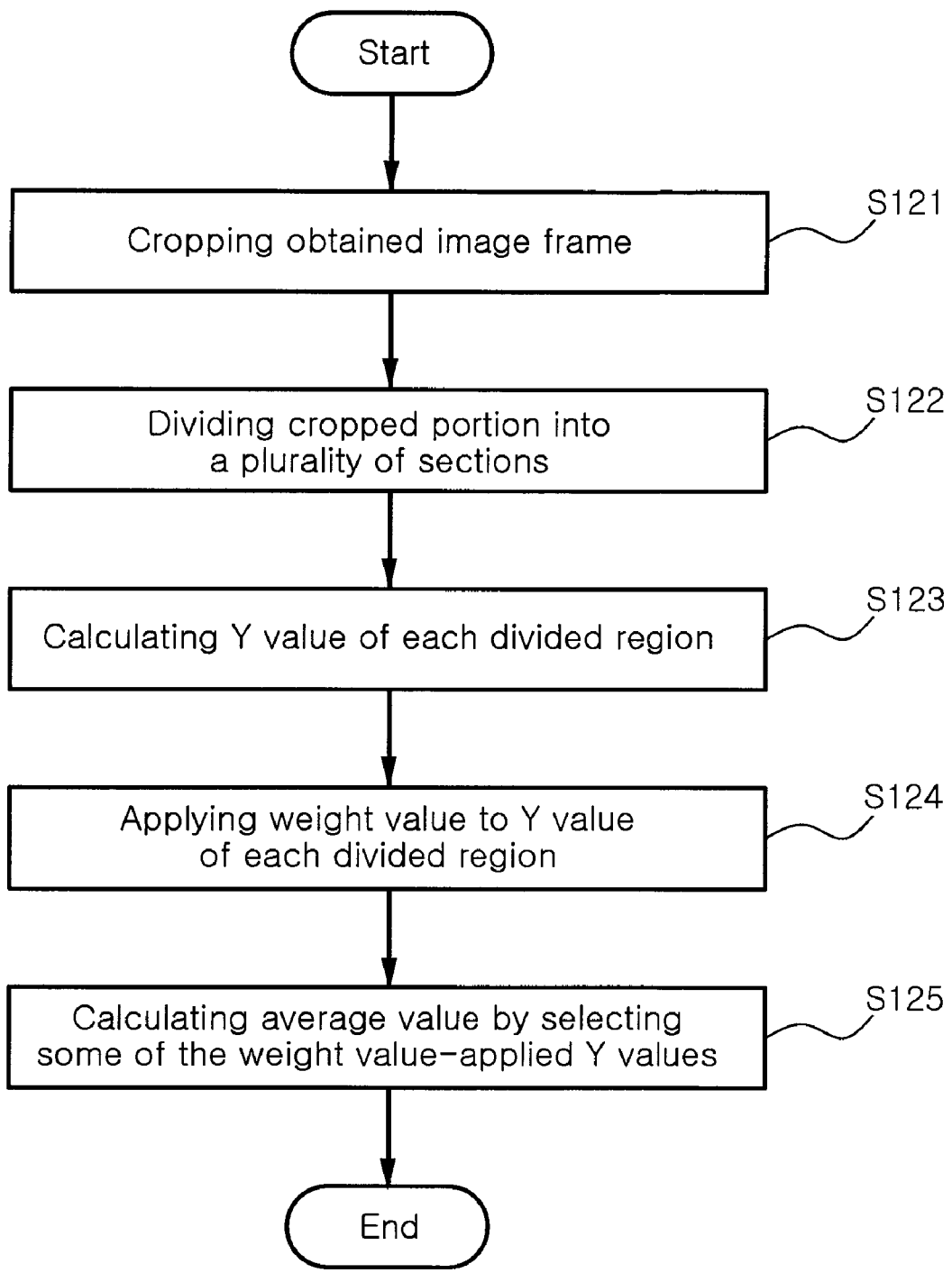
FIG. 5 is a flow chart illustrating the process of calculating an average luminance value of an image frame obtained by the auto-exposure control method according to an embodiment of the present invention.

FIG. 5 is a flow chart illustrating the process of calculating an average luminance value of an obtained image frame. As shown in FIG. 5, the step (S12) of calculating an average luminance value of an obtained image frame may include a step (S121) of cropping an image frame obtained by the image sensor; a step (S122) of dividing the cropped region into a plurality of sections, a step (S123) of calculating a luminance value of each section; a step (S124) of applying a weight value to each calculated luminance value of each section; and a step (S125) of calculating an average luminance value by using some of the luminance values to which the weight value has been applied.

Figure 6:
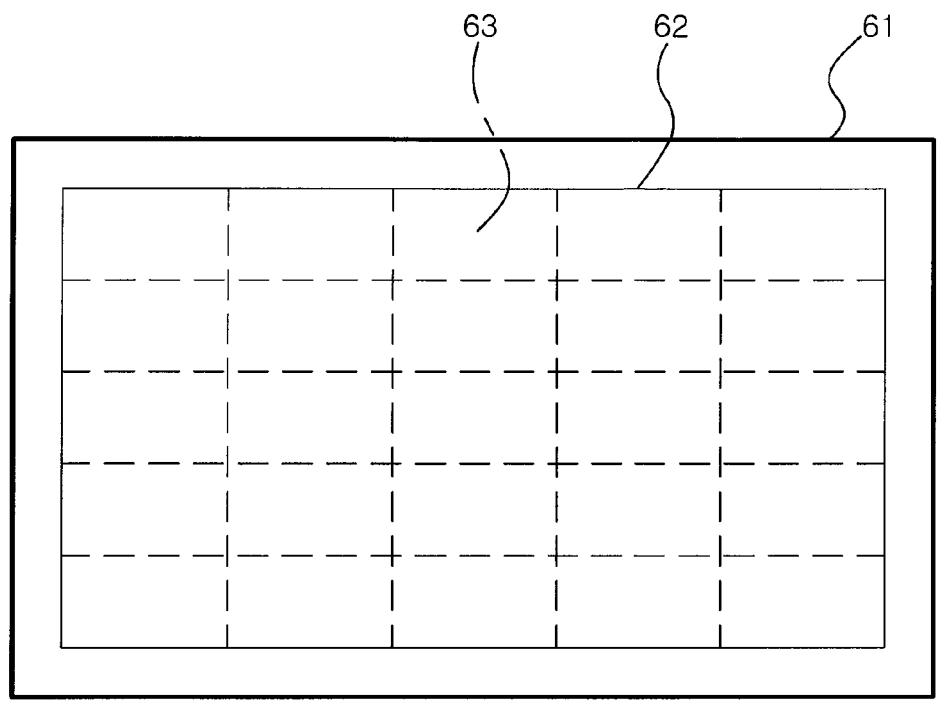
FIG. 6 is a view illustrating cropping of an image frame and dividing it into sections performed in the process of calculating an average luminance value of an image frame obtained by the auto-exposure control method according to an embodiment of the present invention.

FIG. 6 is a view illustrating cropping an image frame and dividing it into sections in the steps S121 and S122. As shown in FIG. 6, A portion of the entire image frame 61 is cropped to generate a cropped image 62 in step S121, and the cropped image 62 is divided into a plurality of sections 63. In the process of calculating an average luminance of the image frame according to the embodiment of the present invention, the marginal portion of the image frame exposed to unnecessary miscellaneous light of a surrounding environment is omitted (excluded) without affecting the quality of an image through cropping, the amount of calculation can be reduced and the major portion of the image can be more suitably exposed.

Figure 7:
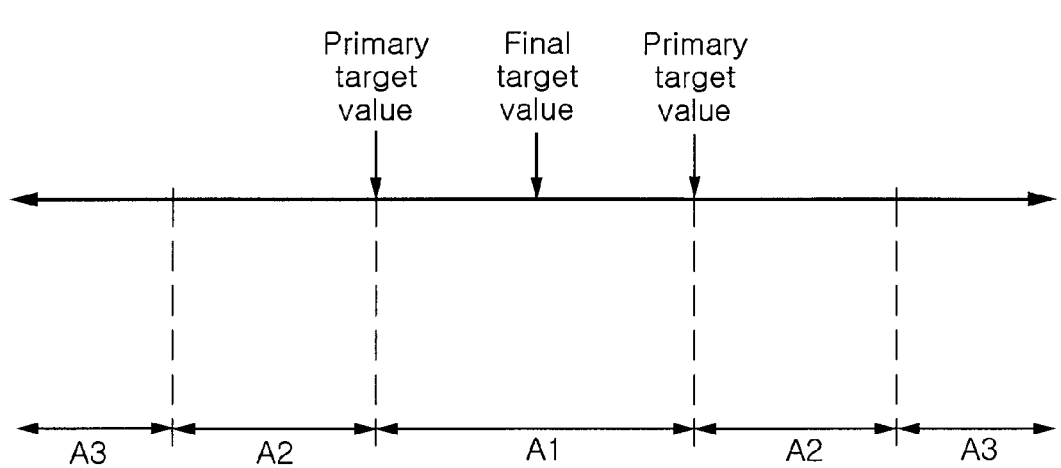
FIG. 7 is a view illustrating a predetermined final target value and pre-set ranges to compare luminance values of an image frame according to an embodiment of the present invention.

In addition, the cropped image frame is divided into a plurality of sections, a luminance value of each section is calculated, and a weight value is applied to positions of the sections to thereby precisely expose a portion (e.g., the central portion) affecting image quality. Also, among the plurality of sections, a section with an excessively high luminance value compared with other sections or a section with an excessively low luminance value are excluded from the average luminance value calculation, thereby eliminating an influence of a portion with the excessive luminance value on the important portion (e.g., a portion where a subject is positioned) of the image As stated above, after creating of the exposure table and the analog gain table is completed (S11) and the average luminance value of the image frame is calculated (S12), it is determined whether or not the average luminance value of the image frame is within the prescribed set range. FIG. 7 is a view illustrating a prescribed final target value and pre-set range to compare luminance values of an image frame according to an embodiment of the present invention. As shown in FIG. 7, the final target value of the luminance is previously determined, and a primary target value may be set at positions separated with the same size in a positive direction and in a negative direction based on the final target value. The range between the two primary target values is the set range (A1) compared with the average luminance value of the image frame. According to an embodiment of the present invention, if the average luminance value is not within the set range (A1), the indexes of the exposure table and the gain table are set again (S14), and an exposure time and an analog gain corresponding to the newly set indexes are applied to the image sensor (S15) to obtain an image frame again.

The step (S14) of setting the indexes of the exposure table and the gain table again may be a step of calculating a shift index step corresponding to the distance between an index which has been applied to a current image frame and an index to be applied to a next image frame. Namely, the step (S14) is a step of calculating a shift size as to how much it will shift from the currently applied index. The size of the shift index step may be set differently depending on the distance between the average luminance value of the image frame and the primary target value. For example, if the average luminance value is positioned within the range A2, because it is close to the primary target value and the average luminance value can be shifted to the set range immediately, the shift index step may be set to be small, while if the average luminance value is positioned within the range A3, because it is positioned away from the primary target value, the shift index step may be set to be large so that the average luminance value can be quickly shifted to the set range.

If the average luminance value is positioned within the set range (A1), it is adjacent to the final target value. Thus, it is checked whether or not the average luminance value and the final target value are identical (S16). If they are not identical, the indexes of the exposure table and the analog gain table to be applied to a next image frame are determined as immediately neighbor indexes of the indexes which have been applied to the current image (S17). In other words, if the average luminance value of the image frame is within the set range (A1), the index shift step for shifting to the index to be applied for obtaining a next image frame is determined as 1. And then, an exposure time and an analog gain corresponding to the newly set indexes are read from the exposure table and the analog table and applied to the image sensor (S18). Subsequently, an average luminance value of the image frame obtained by the image sensor to which the new exposure time and analog gain have been applied is calculated again and then compared to the final target value.

As set forth above, according to exemplary embodiments of the invention, the index shift step for changing indexes according to a range within which the average luminance value of an image frame comes is set to be different depending on the distance from the final target value, whereby when the difference between the average luminance value of the image frame and the final target value is large, the average luminance value of the image frame is adjusted to be quickly close to the final target value, and when the difference between the average luminance value of the image frame and the final target value is small, the index shift step is set to be minimum to stably find out the final target value.

While the present invention has been shown and described in connection with the exemplary embodiments, it will be apparent to those skilled in the art that modifications and variations can be made without departing from the spirit and scope of the invention as defined by the appended claims.

What is claimed is:

1. An auto-exposure control method comprising:
    creating an exposure table and an analog gain table including an exposure time and an analog gain of an image sensor set according to an index, respectively;
    calculating an average luminance value of an image frame obtained by the image sensor;
    checking whether or not the average luminance value is within a pre-set range including a prescribed final target value;
    if the average luminance value is not within the pre-set range, determining a shift step from indexes which have been applied to a current image frame according to the difference between the average luminance value and the final target value in order to determine indexes of the exposure table and the analog gain table to be applied to a next image frame; and
    repeatedly performing of reading an exposure time and an analog gain corresponding to the indexes shifted by the shift step determined from the indexes applied to the current image frame, from the exposure table and the analog gain table, applying the same to the image sensor, obtaining a next image frame, and calculating an average luminance value
    if the average luminance value is within the pre-set range, determining whether or not the average luminance value is substantially the same as the final target value;
    if the average luminance value is not the same as the final target value, determining the indexes of the exposure table and the analog gain table to be applied to the next image frame as neighbor indexes of the indexes which have been applied to the current image frame;
    proceeding to read an exposure time and analog gain corresponding to the determined neighbor indexes from the exposure table and the analog gain table, apply the same to the image sensor, obtain a next image frame, calculate an average luminance value of the obtained next image frame, and determine whether or not the average luminance value is substantially same as the final target value; and
    if the average luminance value is substantially the same as the final target value, terminating the auto-exposure controlling operation.

2. An auto-exposure control method comprising:
    creating an exposure table and an analog gain table including an exposure time and an analog gain of an image sensor set according to an index, respectively;
    calculating an average luminance value of an image frame obtained by the image sensor;
    checking whether or not the average luminance value is within a pre-set range including a prescribed final target value;
    if the average luminance value is not within the pre-set range, determining a shift step from indexes which have been applied to a current image frame according to the difference between the average luminance value and the final target value in order to determine indexes of the exposure table and the analog gain table to be applied to a next image frame; and
    repeatedly performing of reading an exposure time and an analog gain corresponding to the indexes shifted by the shift step determined from the indexes applied to the current image frame, from the exposure table and the analog gain table, applying the same to the image sensor, obtaining a next image frame, and calculating an average luminance value,
    wherein the creating of the exposure table and the analog gain table comprises:
        calculating a maximum exposure time in consideration of a flicker and the characteristics of the image sensor;
        applying a reference index of the exposure table to the calculated maximum exposure time;
        multiplying a pre-set time factor to an exposure time of a previous index, starting from the maximum exposure time as the reference index, to determine an exposure time of a next index to thus complete the exposure table; and
        creating an analog gain table of each index of the completed exposure table.

3. The method of claim 2, wherein, in calculating the maximum exposure time, the maximum exposure time is calculated by Equation 1 shown below:

$$\text{Max\_exp} = \frac{\text{Round}(\text{Duration} \times n \times \text{AntiFlickerFreq})}{n \times \text{AntiFlickerFreq}} \quad \text{[Equation 1]}$$

wherein Max_exp is a maximum exposure time, Duration is a maximum exposure time for obtaining a user desired frame rate, 'n' is a positive integer, AntiFlickerFreq is a frequency at which flicker is generated, and Round is an operator for making a positive number through rounding off.

4. The method of claim 2, wherein the maximum analog gain allocated to the index of the analog gain table applied to each of the exposure table indexes is determined as an analog gain that does not generate noise during the corresponding exposure time.

5. The method of claim 2, wherein the maximum analog gain at the analog gain index applied to the exposure table index to which the maximum exposure time has been allocated among the exposure table indexes is determined as an analog gain that can be applied at the maximum in a low illumination mode.

6. The method of claim 2, wherein the calculating of the average luminance value comprises:
    cropping the image frame obtained by the image sensor;
    dividing the cropped image frame into a plurality of regions;
    calculating a luminance value of each divided region;
    applying a weight value to the calculated luminance value of each divided region; and
    calculating an average luminance value by using at least a portion of the weight value-applied luminance values.

7. The method of claim 2, wherein, in determining the shift step, if the average luminance value is positioned to be close to a boundary value of the pre-set range, the shift index step is set to be smaller, and if the average luminance value is positioned to be away from the boundary value of the pre-set range, the shift index step is set to larger.

* * * * *